(12) United States Patent
Limpens

(10) Patent No.: US 7,951,257 B2
(45) Date of Patent: May 31, 2011

(54) METHOD FOR CONTINUOUSLY PRODUCING A FLEXIBLE COMPLEX AND SAID FLEXIBLE COMPLEX

(75) Inventor: Marc Limpens, Wattrelos (FR)

(73) Assignee: Pennel & Flipo (FR)

( * ) Notice: Subject to any disclaimer, the term of this patent is extended or adjusted under 35 U.S.C. 154(b) by 978 days.

(21) Appl. No.: 11/793,078

(22) PCT Filed: Dec. 19, 2005

(86) PCT No.: PCT/FR2005/003181
§ 371 (c)(1),
(2), (4) Date: Jul. 25, 2007

(87) PCT Pub. No.: WO2006/067321
PCT Pub. Date: Jun. 29, 2006

(65) Prior Publication Data
US 2008/0206499 A1    Aug. 28, 2008

(30) Foreign Application Priority Data
Dec. 17, 2004   (FR) ...................................... 04 13448

(51) Int. Cl.
*B29C 65/02* (2006.01)
*B32B 37/26* (2006.01)
(52) U.S. Cl. ........................................ 156/289; 156/290

(58) Field of Classification Search .................. 156/289, 156/290, 244.11; 427/250, 294
See application file for complete search history.

(56) References Cited

U.S. PATENT DOCUMENTS

| | | | |
|---|---|---|---|
| 3,705,645 A * | 12/1972 | Konen | ............................... 206/6 |
| 4,248,547 A | 2/1981 | Brown | |
| 4,404,057 A * | 9/1983 | Morrison et al. | ............. 156/324 |
| 5,123,987 A | 6/1992 | Mattia | |
| 2004/0026821 A1 | 2/2004 | Chae | |

FOREIGN PATENT DOCUMENTS

| | | |
|---|---|---|
| DE | 1 952 785 A1 | 4/1971 |
| DE | 36 10 656 A1 | 10/1987 |
| FR | 960.043 | 4/1950 |
| FR | 2 856 008 A1 | 12/2004 |
| WO | WO 87/02438 A1 | 4/1987 |
| WO | WO 98/00285 A1 | 1/1998 |
| WO | WO 02/079054 A1 | 10/2002 |

\* cited by examiner

*Primary Examiner* — Philip C Tucker
*Assistant Examiner* — Sing P Chan
(74) *Attorney, Agent, or Firm* — DLA Piper LLP (US)

(57) ABSTRACT

A process for continuous manufacture of a flexible complex including at least one tight pocket including the steps of depositing an anti-adhesive agent on at least one sheet of coated fabric in zones for forming the pocket or pockets, and continuously assembling the sheet of coated fabric on which the anti-adhesive agent was deposited with the sheet of coated fabric by heating and/or pressure.

11 Claims, 2 Drawing Sheets

METHOD FOR CONTINUOUSLY PRODUCING A FLEXIBLE COMPLEX AND SAID FLEXIBLE COMPLEX

RELATED APPLICATION

This is a §371 of International Application No. PCT/FR2005/003181, with an international filing date of Dec. 19, 2005 (WO 2006/067321, published Jun. 29, 2006), which is based on French Patent Application No. 04/13448, filed Dec. 17, 2004.

TECHNICAL FIELD

This disclosure relates to a process for the continuous manufacture of a flexible complex of coated fabric comprising at least one, even several tight pocket(s) that can contain a gas, liquid or possibly a solid. The disclosure also relates to a flexible complex of coated fabric comprising at least one tight pocket.

BACKGROUND

Flexible complexes constituted of a succession of pockets are frequently used for combating pollution or also for lost forms in a marine atmosphere. The realization of these pockets most often requires manufacturing a pocket and then the following pocket is manufactured.

The current methods of manufacture are discontinuous methods. One of the methods consists of assembling a pocket by adhesion, for example. The pockets manufactured in this manner are then successively assembled.

Another method of manufacture consists of assembling two sheets of coated fabric. Uniting the two sheets is made by heating with or without pressure and with or without the addition of material or also by simple adhesion. This uniting is realized step by step. Generally, this latter method is reserved for pockets with large dimensions.

In the case of a plastic sheet, the uniting can be done by high-frequency welding or also by thermal welding or possibly by adhesion. In the case of rubber sheets, it is necessary to vulcanize them in advance. Uniting the two vulcanized sheets can be made either by adhesion or by the addition of a band of non-vulcanized rubber that is vulcanized under pressure.

These discontinuous technologies have the disadvantage of taking a long time and are therefore onerous. In particular, they require a supplementary operation of continuous vulcanization before or after the manufacture for fabrics coated with rubber.

There is, therefore, a need for a process for manufacturing a flexible complex comprising at least one tight pocket that is less onerous while permitting the obtention of a resistant product.

SUMMARY

I provide a process for continuous manufacture of a flexible complex including at least one tight pocket including the steps of depositing an anti-adhesive agent on at least one sheet of coated fabric in zones for forming the pocket or pockets, and continuously assembling the sheet of coated fabric on which the anti-adhesive agent was deposited with the sheet of coated fabric by heating and/or pressure.

I also provide a flexible complex including at least one tight pocket, an inner surface of which pocket is covered on one of its faces by an anti-adhesive agent.

DETAILED DESCRIPTION

Figure 1:
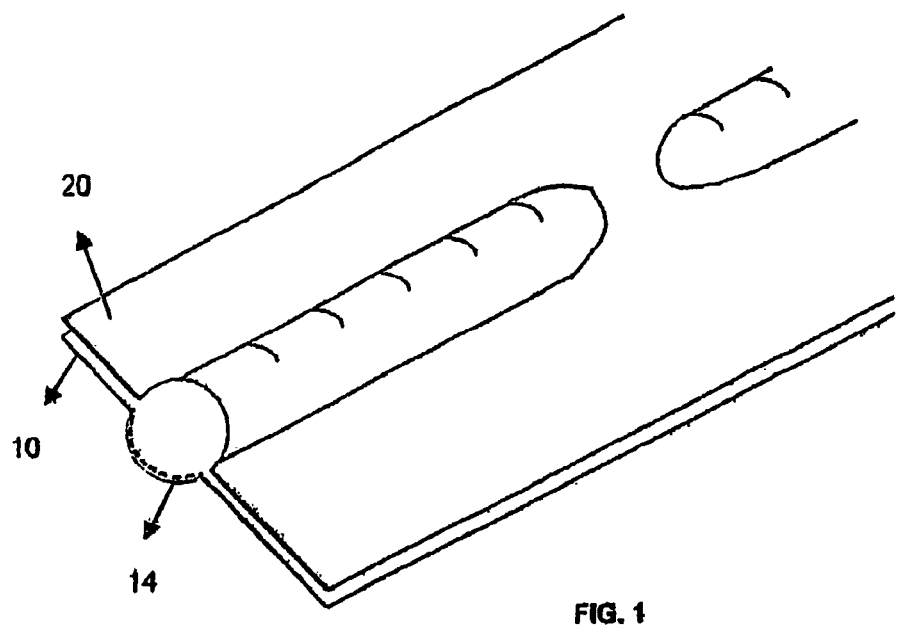
FIG. 1 is a schematic perspective view of a complex comprising two sheets of coated tissue and one anti-adhesive that form tight pockets.

I discovered that a specific manufacturing process permitted the problems presented above to be resolved entirely or at least in part. Thus, I provide a process for the continuous manufacture of tight pockets comprising, in particular for fabrics coated with rubber, a vulcanization integrated into the described process.

According to one aspect, I provide a process for the continuous manufacture of a flexible complex comprising or constituted of at least one tight pocket comprising the steps:
  depositing an anti-adhesive agent on at least one sheet of coated fabric in the zones for forming the pocket or pockets, and
  continuously assembling the sheet of coated fabric on which the anti-adhesive agent was deposited with the sheet of coated fabric by heating and/or pressure.

Compared to discontinuous assembly methods, using a continuous assembly machine, in particular one operating under pressure and/or at a high temperature, can have several advantages:
  At the assembly level: these are autogenous assemblies, therefore, without the addition of supplementary material such as adhesive that has a different composition than the coatings and that can constitute a weak point.
  At the esthetic level: this process allows the use of a textile back cloth that can confer a uniform aspect. In particular, when a back cloth consisting of textile support or any other sheet is used at the moment of assembly, this can confer a uniform and decorative aspect. The significant variants of back cloths can allow the product to be personalized. Finally, this operation of personalization or decoration can be carried out at the same time as the operation of assembly and it is, therefore, simple and not very onerous to carry out.
  At the level of bulkiness: after inflation of the pockets, the complex realized can be substantially, even perfectly, flat without a significant excess thickness, which limits its bulkiness after folding.

The expression "fabric" denotes a structure constituted of warp and woof threads that are generally perpendicular.

The expression "continuous" denotes that there is no break in the rhythm, especially no stop time. In particular, no stop between the production of a pocket and the following one.

More precisely, the expression "continuous process" denotes a process in which the product exits in a regular manner without a stop between the different pockets and/or the different articles produced.

"Simultaneously" means that the operations are carried out in one and the same operation and that in particular when an operation of depositing the anti-adhesive agent takes place at a certain level of the fabric, an assembly operation takes place a little further on the same fabric.

More particularly, the process and/or the assembly stage is/are carried out at a substantially constant speed, that is, varying by less than 20%, in particular less than 10% and is even carried out at a constant speed.

The stage consisting of depositing the anti-adhesive agent on the coated fabric can, as far as it is concerned, be carried out step by step or continuously.

The speed of depositing the anti-adhesive agent can be greater than or equal to 8 m/h, in particular, greater than or equal to 12 m/h, in particular, greater or equal to 15 m/h and even greater than or equal to 20 m/h.

It is possible to provide an accumulation stage between the stage of depositing anti-adhesive and that of assembling the fabrics, in particular, when the speed of depositing the anti-adhesive agent is greater than that of assembly.

The assembly stage can be carried out for its part at a moving speed of the coated fabric that is greater than or equal to 8 m/h, in particular, greater than or equal to 12 m/h, in particular, greater or equal to 15 m/h and even greater than or equal to 20 m/h.

During the assembly stage, it is possible to insert a back cloth, in particular, a fabric. The relief of this fabric will provide a grain or embossed coating 3. The fabric can be removed after the assembly operation. This can allow the article produced to be personalized or decorated without performing a supplementary stage in the process.

The process can furthermore comprise a previous stage consisting of realizing at least two sheets of coated fabric.

I also provide a process for the continuous manufacture of a succession of tight pockets formed from two sheets of coated fabrics, which fabric is constituted of warp and woof threads, characterized in that in that the steps of the manufacturing process are as follows:

stage 1:
An anti-adhesive is continuously deposited on the first sheet of coated fabric at the locations where the pockets will be found. The continuous placing of this anti-adhesive can be robotized.

step 2:
The first sheet is continuously united to the second sheet.
For fabrics coated with rubber, simultaneously and continuously, on the one hand the two sheets are vulcanized and on the other hand they are united in the zones without anti-adhesive by pressure and heating.
For the fabrics coated with plastic the two sheets are continuously united in the zones without anti-adhesive by pressure and heating.

According to other characteristics:
The steps of depositing the anti-adhesive and assembly can be carried out simultaneously. The stages can be carried out, in particular, without a stop between the stage of depositing anti-adhesive agent and the assembly stage, and/or without another stage being intercalated between the stage of depositing anti-adhesive agent and the assembly stage, in other words, the one directly follows the other.
The fabric of each sheet can be covered with coating on one face or on both faces.
The coating can comprise or be constituted of at least one layer of rubber or at least one layer of plastic.
The anti-adhesive agent can be constituted of a product incompatible with the coating of the sheets and supportive of pressure such as, e.g., a non-melting film, a powder, a dispersion or a solution of anti-adhesive.
This manufacturing process is not limited to two sheets of coated fabric, but rather it is possible to assemble N sheets. In this instance, the assembly can be made with N-1 sheets of coated fabric that have the anti-adhesive agent 14 (FIG. 1) and 1 sheet without anti-adhesive agent.

FIG. 1 is a schematic view in perspective of the complex comprising two sheets of coated tissue 10 and 20 and one anti-adhesive 14 to form tight pockets.

The following description of the manufacturing process is given by way of example.

The sheets of fabric coated with rubber 10 and 20 are realized in a preparatory stage.

Figure 2:
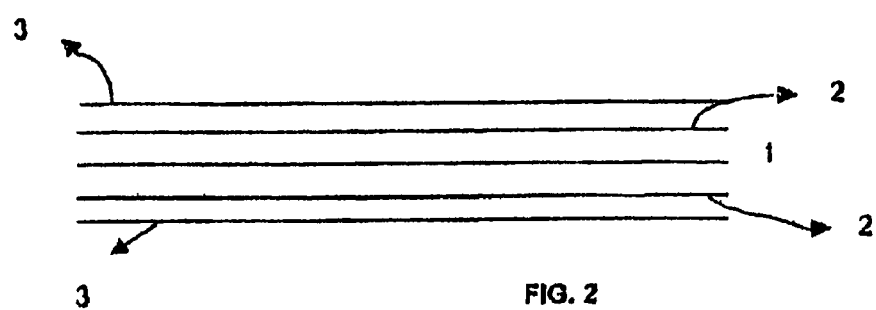
FIG. 2 is a sectional view taken from FIG. 1.
Figure 3:
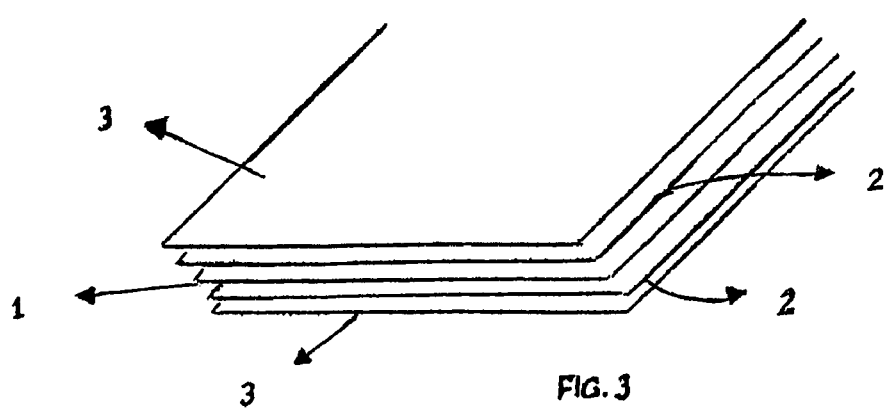
FIG. 3 is another perspective view of selected layers taken from FIG. 1.

The different steps of this realization schematized in FIG. 2 (sectional view) and FIG. 3 (perspective view) are as follows:

Continuous deposition of an adhesive 2 on fabric 1, FIGS. 2, 3, which adhesive is a dispersion or a polymer solution.

The adhesive can be deposited on a single face of the fabric or on both faces. This adhesive is deposited to permit obtention of a good adherence between elements 1 and 3. It is made on a spreader and the adhesive is formulated in such a manner as to have a good adherence between fabric 1 and coating 3.

Drying of this dispersion or solution.

Continuous depositing by calendering on the adhesive layer of at least one layer of a coating 3, FIG. 2, which is a mixture of rubber formulated in such a manner as to render the pockets tight and correspond to the usage characteristics of the device. Anti-adhesive 14 is placed with the sheets of coated fabrics realized in this manner in the first stage on the first sheet of coated fabric 10 at the area corresponding to the pockets. This anti-adhesive agent can comprise or be constituted either of a non-melting film or a powder such as talcum or Bentone or by a dispersion or a solution of anti-adhesive.

In the second stage of uniting, the sheet of coated fabric 10 that received anti-adhesive 14 is assembled onto sheet 20 without anti-adhesive by heating and/or pressure. Heating allows the rubber to become vulcanized and the pressure imparts cohesion and adherence on the one hand between the fabrics 1 and 2 and the coating 3 and on the other hand between the sheets of coated fabrics 10 and 20 at the locations where there is no anti-adhesive.

This operation can be performed continuously on a machine comprising a heated cylinder and an apron feed provided with jacks to ensure the pressure or also by passage between two cylinders of which one or both can be covered with polymer to ensure a uniform pressure.

In particular, the two-stages described above are performed simultaneously.

Furthermore, the process can comprise a stage that allows the flexible complex to present a system A that permits filling, in particular, inflating all the pockets 6 at one time and/or at a single point. This system A can correspond to passages 4 connecting pockets 6 one after the other, thus allowing them to be filled at one time and/or at a single point.

Figure 4:
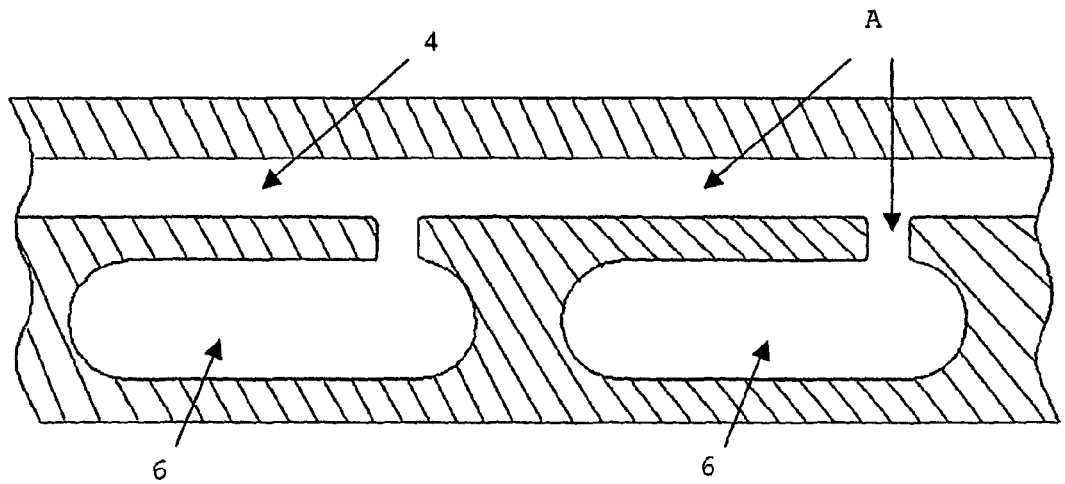
FIG. 4 is a schematic sectional view of a flexible complex.

FIG. 4 represents an embodiment of a flexible complex comprising a system A. This stage of the unit of system A can be realized, in particular, by a stage of the process in which depositing an anti-adhesive is also carried out at the locations intended to form passages 4 between pockets 6, in particular, where it is desired that the pockets communicate.

According to one aspect, placing the anti-adhesive intended to permit the formation of system A can be concomitant with placing the anti-adhesive agent intended to permit formation of the pockets.

However, a flexible complex in which the pockets are connected to each other can have the disadvantage that in the case of a leak, all the pockets can become empty.

To remedy this problem entirely or in part, I discovered a system that allows the volume to be limited that can escape in case of a leak, especially of the type in which the wall of a pocket is pierced.

The process can, therefore, comprise a stage that allows obtention of a flexible complex in which it is possible to obturate passages 4 existing between the pockets, especially when the latter are filled, e.g., by a gas, liquid or a solid.

This can be realized in particular by a stage consisting of depositing, before or during the assembly of the sheets, an obturator 5 at the level of the locations intended to form passages 4 between the pockets, in other words, at the level of system A, or also at the level of the distribution zone intended to form a passage between the pockets.

This obturator 5, in particular inflatable, can consist of a tube 5 with an adjustable diameter, in particular, elastic with a diameter at rest lower than the size of the passages between the pockets in such a manner that the pockets can be filled at a single time and/or at a single point.

Figure 5:
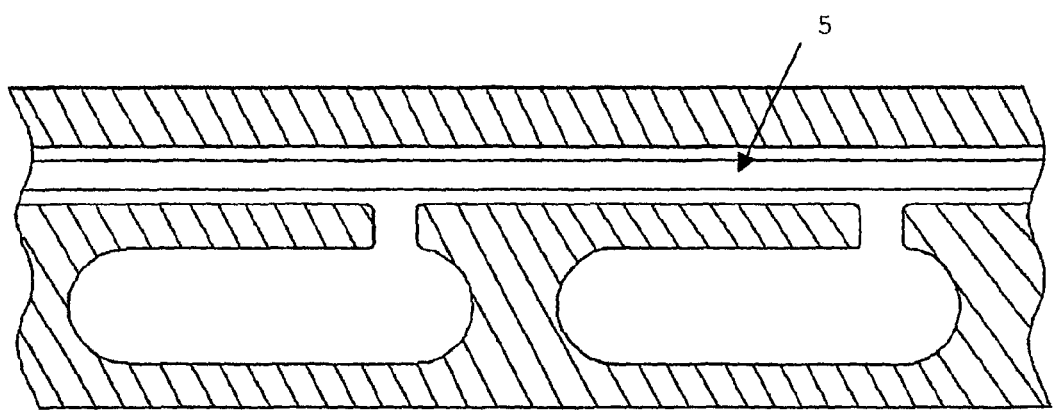
FIG. 5 is a sectional view of a flexible complex including an inflatable elastic tube.

FIG. 5 shows an embodiment of a flexible complex comprising an obturator 5 in which the latter is an inflatable elastic tube. Obturator 5 can allow passages 4 between pockets 6 to be obturated in a single operation, e.g., by filling it.

Once pockets 6 are filled, the diameter of tube 5 can be increased in such a manner that it comes to rest on the walls of passages 4 between the pockets and obturates them. The increase of the diameter of tube 5 can be due to its being filled, in particular, by air. In this instance, tube 5 can be realized by a plastic or elastomeric material with a great return force and a low modulus.

Figure 6:
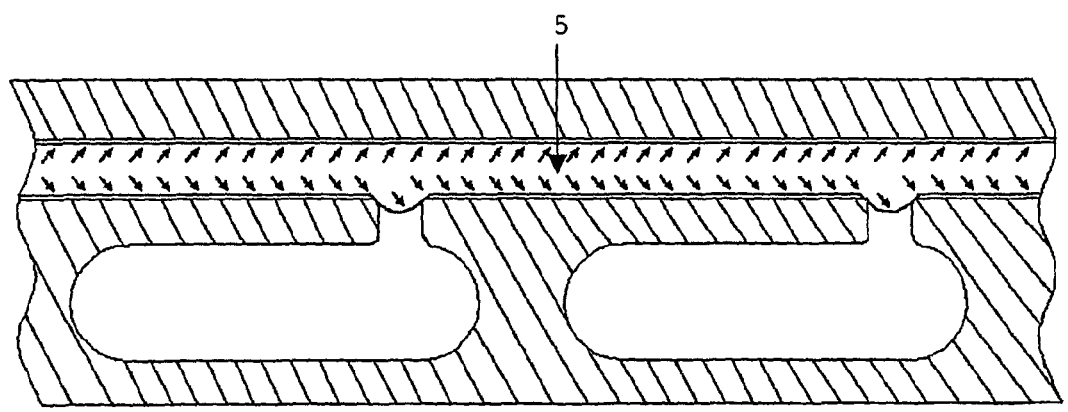
FIG. 6 is a cross-section of a flexible complex wherein an inflatable elastic tube obturates selected openings.

FIG. 6 shows an obturation.

According to a particular embodiment the process comprises the stages:
depositing anti-adhesive on a coated fabric at the location intended to form pockets and passages that allowed the various pockets to be inflated,
depositing tube at the level of the surface defined by the anti-adhesive, which tube allows passages between pockets to be obturated, in particular, once the latter have been filled,
continuously assembling the sheet of coated fabric on which the anti-adhesive agent was deposited to the sheet of coated tissue by heating and/or pressure.

The above-described process can permit, in particular, flexible complexes to be produced that comprise several pockets that are parallel and/or successive.

According to another aspect, I provide a flexible complex comprising at least one tight pocket, the internal surface of which pocket is covered entirely or in part and, in particular, on one of its faces with an anti-adhesive agent.

The tight pockets can:
each comprise a valve allowing the filling of each pocket which implies a discontinuous inflating, pocket by pocket,
be connected to each other in such a manner that all the pockets can be inflated at one time, which is then a continuous inflation.

More precisely, passages 4 between pockets 6 can comprise an obturator 5, especially inflatable, e.g., of the bladder or tube type, especially elastic, that permits these passages to be obturated.

The flexible complexes described can be:
flexible, inflatable dams, especially useful when combating aquatic pollution,
concrete forms, especially for maritime applications,
inflatable rafts or boats,
inflatable structures, e.g., rapid deployment tent, decontamination shower or
inflatable or weighted dikes, especially for combating floods.

The invention claimed is:

1. A process for continuous manufacture of a flexible complex comprising at least one tight pocket comprising the steps:
depositing an anti-adhesive agent on at least one sheet of coated fabric covered with a coating on one face or on both faces with a layer of coating comprising rubber in zones for forming the pocket or pockets, and
depositing a tube at locations that form passages between the pockets;
continuously assembling the sheet of coated fabric on which the anti-adhesive agent was deposited with the sheet of coated fabric by heating and/or pressure at a moving speed of the fabric greater than or equal to 8 m/h.

2. The process according to claim 1, wherein the steps of depositing the anti-adhesive and assembly are carried out simultaneously.

3. The process according to claim 1, wherein the assembly is carried out at a moving speed of the fabric that is greater than or equal to 12 m/h.

4. The process according to claim 1, wherein the assembly is carried out at a moving speed of the fabric that is greater than or equal to 15 m/h.

5. The process according to claim 1, wherein the assembly is carried out at a moving speed of the fabric that is greater than or equal to 20 m/h.

6. The process according to claim 1, wherein the coating further comprises plastic.

7. The process according to claim 1, further comprising depositing anti-adhesive agent at locations intended to form passages between the pockets.

8. The process according to claim 1, wherein the heating and the pressure of the sheets of fabric coated with a rubber cause the rubber to be vulcanized and impart cohesion and adherence between the fabric and the coating.

9. The process according to claim 1, wherein the anti-adhesive agent is a product incompatible with the coating of the sheets.

10. The process according to claim 9, wherein the product is at least one selected from the group consisting of a non-melting film and a powder or a dispersion or a solution of anti-adhesive.

11. The process according to claim 1, wherein N sheets are assembled with N−1 sheets having an anti-adhesive agent and a sheet without anti-adhesive.

* * * * *